Jan. 5, 1943. H. L. COHEN 2,307,452
SLITTING AND SCORING MACHINE
Filed Aug. 7, 1940 8 Sheets-Sheet 1

FIG.1

INVENTOR.
HARRY L. COHEN
BY
ATTORNEY.

FIG. 2

INVENTOR.
HARRY L. COHEN
BY
ATTORNEY.

FIG. 3

Jan. 5, 1943.  H. L. COHEN  2,307,452
SLITTING AND SCORING MACHINE
Filed Aug. 7, 1940   8 Sheets-Sheet 4

FIG. 4

INVENTOR.
HARRY L. COHEN
BY
ATTORNEY.

Jan. 5, 1943. H. L. COHEN 2,307,452
SLITTING AND SCORING MACHINE
Filed Aug. 7, 1940 8 Sheets-Sheet 6

INVENTOR.
HARRY L. COHEN
BY
*Samuel Ostrolenk*
ATTORNEY.

Jan. 5, 1943.   H. L. COHEN   2,307,452
SLITTING AND SCORING MACHINE
Filed Aug. 7, 1940   8 Sheets-Sheet 7

INVENTOR.
HARRY L. COHEN
BY
*Samuel Ostrolenk*
ATTORNEY.

Patented Jan. 5, 1943

2,307,452

UNITED STATES PATENT OFFICE 2,307,452

SLITTING AND SCORING MACHINE

Harry L. Cohen, New York, N. Y., assignor to S. & S. Corrugated Paper Machinery Co., Inc., Brooklyn, N. Y., a corporation of New York Application August 7, 1940, Serial No. 351,749

14 Claims. (Cl. 164—60)

This invention relates to slitting and scoring machines and more particularly to a novel type of mounting for the shafts which carry the slitting knives so that circular or continuous slitting knives may be applied to the shaft.

In the ordinary operation of slitting and scoring machines one pair of juxtaposed shafts carries sets of circular knives mounted thereon. These circular knives preferably are arranged so that they may be moved to different positions on the shaft in order to permit different settings for various types of cuts, and likewise these knives are removable for regrinding and also in the event that a change in the number of cuts is desired.

Heretofore, it has been difficult if not impossible to make the knives and their mounting members truly circular, but instead it has been necessary to use a pair of segments which have been clamped in juxtaposed relationship. The reason for this was that the only way truly circular knives and mountings might be removed from the shaft was by dismounting the shaft from the machine itself. Owing to the fact that the shafts and other members of slitting and scoring machines are massive, such an operation would be costly and indeed impractical.

However, the circular knives when split into segments and mounted and clamped on the shaft in this manner tended to produce uneven cuts owing to the fact that it was very difficult, if not impossible, to obtain a perfect joint or seam between the two segments of the knife members.

In my present invention I have devised a method by which one end of the shaft may be disengaged from the main frame with a space left between that end of the shaft and the main frame while the shaft nevertheless remains in desired relationship to the main frame, so that truly continuous circular cutting knives and their mountings may be placed upon and removed from the shaft without requiring dismounting of the shaft.

In order to accomplish this result I support the shafts on the frame at one end by appropriate bearings, and at the other end provide a means for supporting the shafts while at the same time disconnecting them from the frame. The means for providing this support and the means for disconnecting one end of the shaft from the frame and providing the space between the end of the shaft and the frame of sufficient width to permit the mounting and removal of circular cutting knives is more specifically described herein in connection with the figures.

An important object of the present invention thus is to provide in connection with slitting or scoring machines or combinations of both a means for disconnecting one end of a shaft from the frame while at the same time maintaining the relative position between the shafts and the frame.

Another object of the present invention is, in connection with the disconnecting means above described, to provide a sufficient gap between the disconnected end of the shaft and the frame itself to permit the mounting or removal of continuous circular knives.

Still another object and purpose of the present invention is to provide simplified means for supporting the end of the shaft in its regular relationship with the frame while the said end of the shaft is disconnected.

In the operation of slitting and scoring machines it frequently becomes necessary particularly where juxtaposed rollers are used for this purpose to change the spacing between the rollers so that the type of cut or the type of score desired may be varied. In order to provide for this result I have mounted at least one of my shafts in an eccentric bearing and provided simplified means for rotating the bearing in order to move said one shaft either closer to or further away from its juxtaposed shaft.

An important object, therefore, of the present invention is the provision of simplified means for changing the spacing between juxtaposed cutting or scoring shafts.

Further in the operation of my invention I have found it necessary and desirable to provide appropriate side gauges for the material which is to be cut and scored so that it will be appropriately spaced with respect to the cutting knives and scoring members.

Accordingly, I have provided a side gauge which may readily be manually adjusted to the appropriate position and wherein both ends of the gauge may be adjusted by means of a single adjustment or wherein the ends of the gauge may be separately adjusted and brought slightly out of true parallel relationship should that be desired.

Still another object, therefore, of the present invention is the provision of the side gauge and positioning means therefor whereby a single adjustment will simultaneously adjust both ends of the side gauge and where both ends of the side gauge may selectively be separately adjusted to different positions.

Owing to the fact that it is possible by the construction of my invention to use a simplified completely circular knife which may readily be placed upon or removed from the shaft, I may give the knife any construction which may be necessary and proper in order to produce a perfect cut.

Thus I employ a resilient washer between the knife plate and the knife mounting in order to ease the shock upon the knife plate. I may also place a shoulder on the knife holder to support the sheet as it is cut and I may also place a groove between the sheet supporting shoulder of the mounting of the knife and the knife itself in order to provide a sufficient clearance for the complementary knife blade; and, in order to avoid marring the shaft, I may place a resilient washer which may, owing to the hardness of the other structures, be made even of cast iron, in order to provide a resilient protective surface between the locking nut of the knife mounting and the shaft itself.

These and many other objects of the present invention will in part be apparent and in part pointed out in the following description and drawings, in which:

Figure 1:
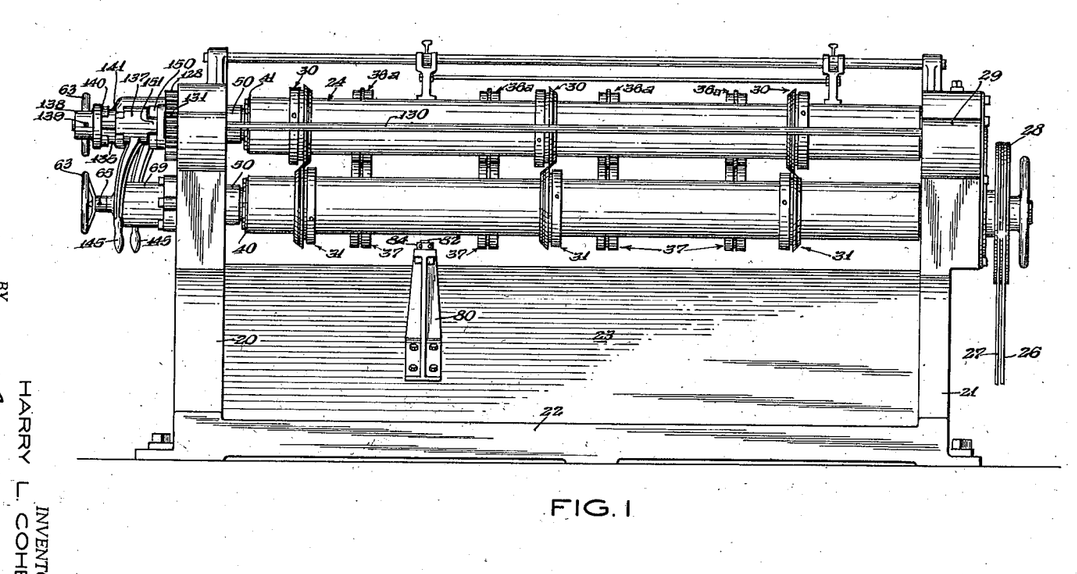
Figure 1 is a front view of the novel slitting and scoring machine of my invention.
Figure 2:
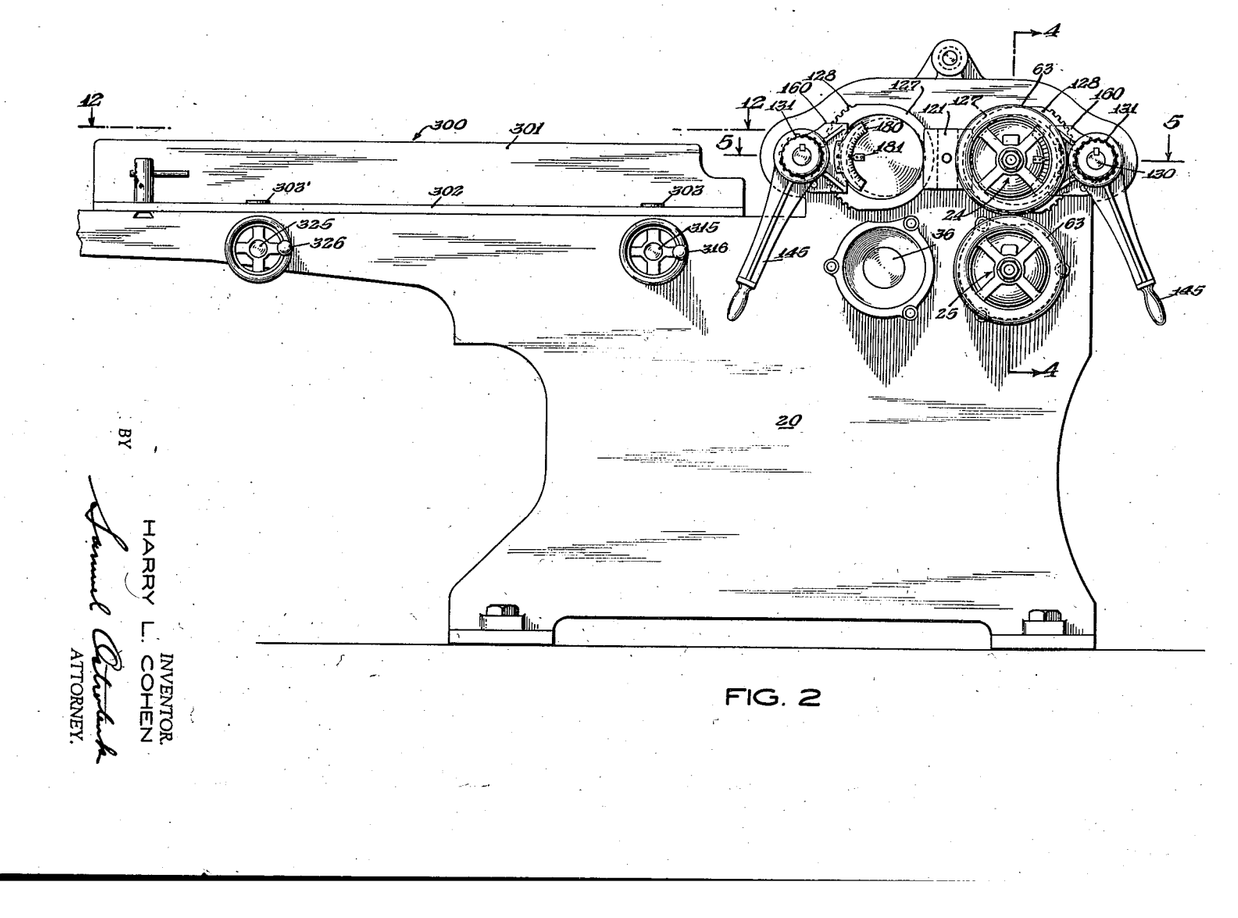
Figure 2 is a side view of the slitting and scoring machine.
Figure 3:
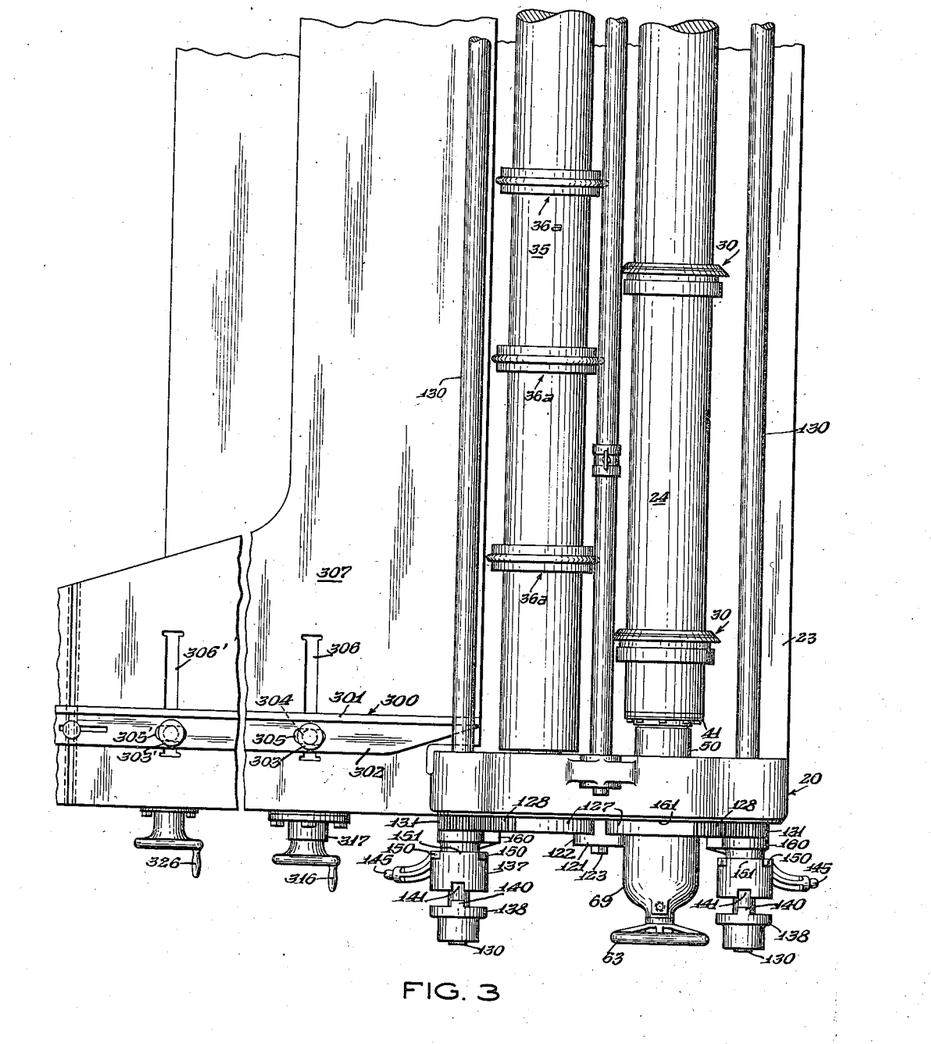
Figure 3 is a partial top view of the slitting and scoring machine.

Referring now to Figures 1, 2 and 3, I have here shown my novel form of cutting and scoring machine which comprises the side frame members 20 and 21 which are interconnected in any suitable manner as, for instance, by the base plate 22 and the connecting or bracing member 23.

The cutting shafts 24 and 25 are rotatably supported in suitable bearings hereinafter described in the side frame members 20 and 21.

Motive power is transmitted for the purpose of rotating the shafts 24 and 25 from any suitable power source (not shown) by means of the belts 26 and 27 to the pulley 28. The pulley 28 may be arranged either to drive the shaft 25 directly and thus may be mounted thereon or may be mounted on a shaft which is connected by suitable gears to the shaft 25 and the shaft 25 may if desired be connected by any suitable gears to the shaft 24 for causing the same to rotate. Such gearing arrangements are well known to those skilled in the art and need not be specifically described. The gears, however, are preferably housed in the housing 29 of the side frame member 21.

Each of the shafts 24 and 25 carries thereon a plurality of knife carrying members 30, 30 and 31, 31 which are arranged to complement each other in order to produce a cut in the manner hereinafter described. The material to be cut is fed between the shafts 24 and 25, being suitably positioned while it is passed therebetween, and the circular cutting members 30 and 31 produce the desired cut in the selected portions of the sheet, these portions being predetermined, of course, by the spacing of the knives 30 and 31 on their respective shafts.

As is also seen in Figure 3 and as is partially seen in Figure 1, a pair of scoring shafts 35 and 36 may be mounted immediately in front of the slitting shafts and these may carry suitable complementary scoring members 36a, 36a and 37, 37.

One of the major elements of my invention involves the mounting of the cutting shafts 24 and 25 in such a manner that the ends 40 and 41 of each thereof may readily be disconnected from the side frame 20 while the shafts 24 and 25 maintain their predetermined fixed relationship with the remainder of the machine and while these shafts are supported in such predetermined relationship.

The reason for seeking this result is to permit the mounting and dismounting of circular cutting knives upon the shaft. The specific means for accomplishing this result is most clearly shown in Figure 4 which should for further explanation of this invention be taken in connection with Figures 7 and 1.

Figure 4:
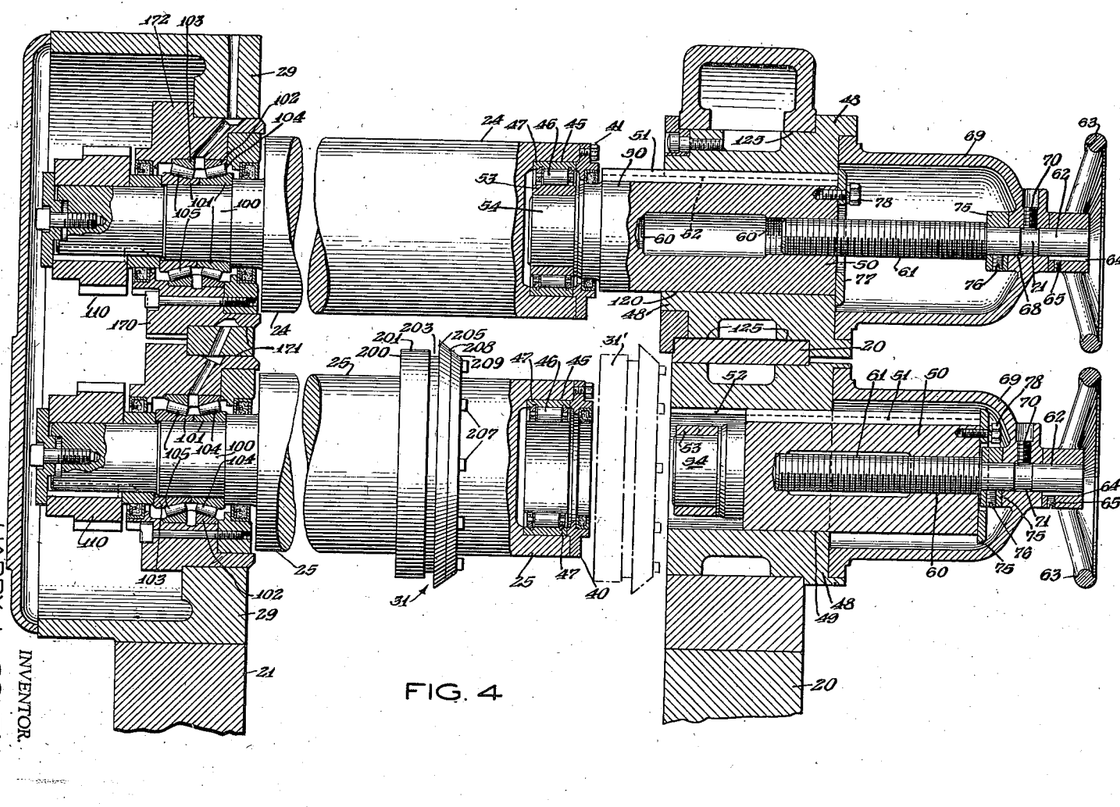
Figure 4 is a cross-sectional view taken along line 4—4 of Figure 2.
Figure 7:
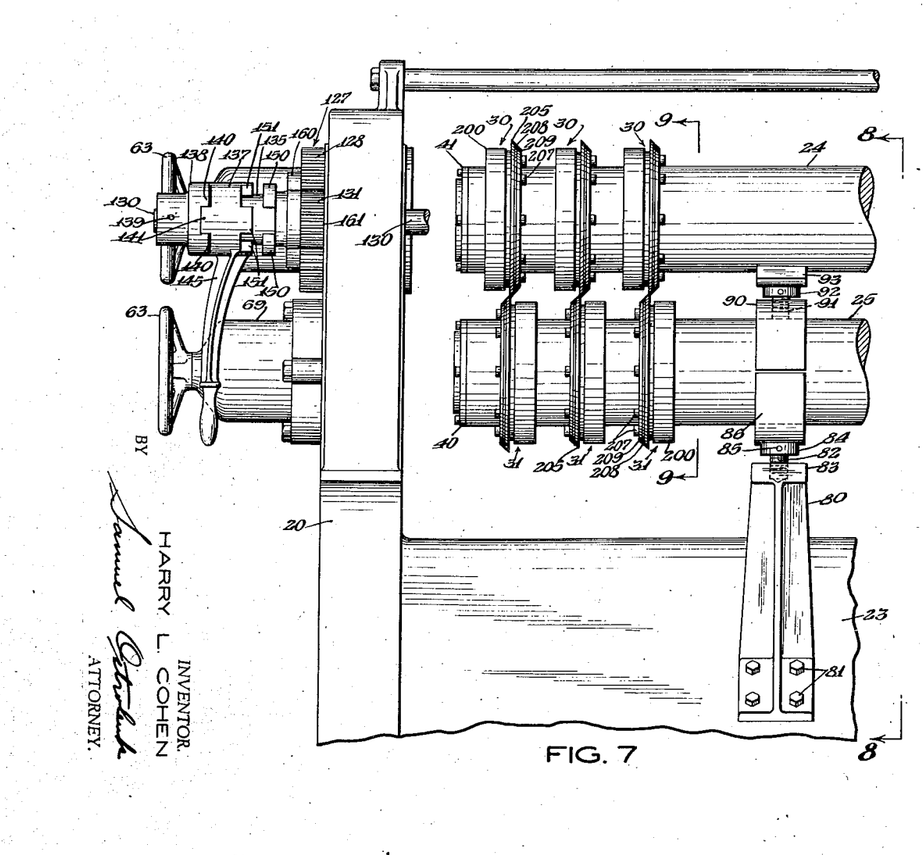
Figure 7 is an enlarged complementary view corresponding to the left hand end of Figure 1, showing the ends of the shafts arranged and supported for placement or removal of the cutting members.

As is seen in Figure 4 the end 40 of the shaft 25 is free of the frame portion 20 while the end 41 of the shaft 24 is still connected to the frame 20, while in Figure 7 both of the ends 40 and 41 are disconnected.

The particular form of the bearings utilized and the mounting of said bearings constitute to a major extent the members which permit this result. Taking, for instance, shaft 25, the end 40 of which is supported in exactly the same manner as the end 41 on the shaft 24—the said end 40 of the shaft 25 has at one end thereof a recess or counterbore 45 in which is secured a plurality of roller bearings 46, the said roller bearings being captured in the bearing mounting 47. The frame 20 carries a bearing support 48 which is secured thereto in any suitable manner. The interior of this bearing support is hollowed out at 49 and preferably is circular in cross-section.

A block 50 is slidably positioned within the hole 49 and is prevented from rotation within the hollow portion 49 by the feather key 51 thereof which rides in the slot 52 of the hollow 49 of the bearing support 48.

A stub shaft 54 is mounted upon one end of the block 50 and carries thereon an annular ring or tire 53 which may provide a suitable hard bearing for roller bearings.

When the block 50 is in the position shown at the bottom of Figure 4, then the stub shaft 52 is not within the counterbore 45 of the shaft 25 and hence there is no operative or supporting connection therebetween. As a matter of fact, the stub shaft 54 is entirely retracted into and beyond the line of the supporting frame 20, and thus, as may readily be seen at the bottom of Figure 4, the knife indicated by the dotted lines 31 may be readily slipped over the end of the shaft between the end of the shaft and the frame and thus withdrawn from the shaft. The block 50, as is more readily seen in the upper portion of the construction of Figure 4, is threaded at 60 and a screw 61 is in threaded engagement with the threads 60.

It will now be obvious that, owing to the fact that the block 50 cannot rotate within the hollow 49 (because of the engagement of the feather key 51 with the slot 52), rotation of the screw 61 within the threaded portion 60 of the block 50 will result in a sliding movement of the block 50 and thus result in the retraction or insertion of the stub shaft 54. This is particularly so when the screw 61 is so arranged that it can rotate without being moved longitudinally of itself.

The screw 61 terminates in a shaft 62 which preferably is an integral extension thereof and a handle 63 is secured thereto in any suitable manner, as for instance by the key 64 and the set screw 65. The screw 61 is rotatable in the bearing 68 which preferably may be an integral portion or extension of the covering or protective housing 69. A set screw 70 may be provided in the bearing 68 to engage within the annular depression 71 of the shaft 62 of the screw 61. The set screw 70 is not during operation of the screw 61 driven tightly against the shaft 62 but is driven into the angular depression 71 a sufficient distance to inhibit or prevent longitudinal vibration of the screw 61.

However, after the screw 61 has been rotated to the position shown at the upper portion of Figure 4 where the stub shaft 54 is supporting the shaft 24, then the set screw 70 may be rotated into tight engagement with the annular depression 71 in the shaft 62 of the screw 61 in order to prevent any possibility of accidental or unintended withdrawal of the stub shaft 54. And a lock washer 75 may be secured in any suitable manner, as by the set screw 76, on the shaft 62 of the screw 61 on the interior of the housing 69 to insure that the screw 61 cannot move longitudinally and to thus insure that the rotation of the screw 61 will result in a sliding of the block 50.

A circular washer plate 75 may be mounted in any suitable manner as by the screw 76 upon the end of the block 50, the said washer being wider than the block 50 and bearing against the ends of the bearing block 48 in order to limit movement of the block 50 toward the shafts 24 or 25 to insure that the stub shaft 54 will be accurately positioned with respect to the rollers 46 when the stub shaft is in proper engagement therewith.

By this means and by the simple rotation of the handle 63 it is thus possible to withdraw the mounting of one end of the shaft from the shaft itself without disturbing the shaft and thus to remove the knives 30 or 31 from the end of the shaft.

It remains, however, in order that this operation may properly be performed, to provide a suitable alternative support for the ends 40 and 41 of the shaft in order that the shafts may maintain their predetermined relationship with the machine while the knives are being removed, arranged or interchanged.

As is seen in Figure 7, both of the stub shafts 54 and the blocks 50 have been removed or retracted into the end frame 20 and the shafts 24 and 25 are no longer supported from the end frame 20.

Figure 8:
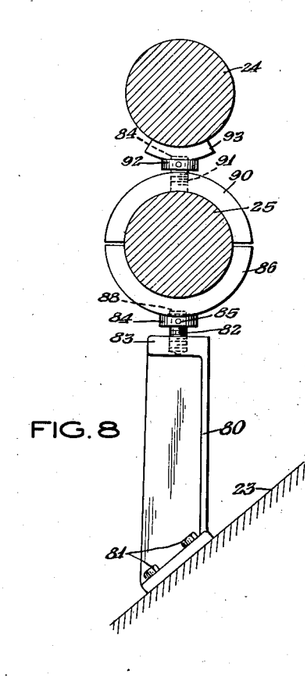
Figure 8 is a cross-sectional view, partly in elevation, taken along the line 8—8 of Figure 7.

A substitute means of support is shown more specifically in Figures 1, 7 and 8 in which a post or bracket 80 is mounted in any suitable manner, as for instance by the bolts 81, upon the crossbrace 23 and has means at the top thereof for supporting the shafts 24 and 25.

These means comprise the screw 82 which is supported by the top 83 of the post or bracket 80 and the nut 84 which is in threaded engagement with the screw 82. The nut 84 has a series of holes 85 therein in which a rod may be inserted in order to rotate the screw.

A semi-circular supporting bracket 86 is provided which has an opening 88 in the bottom thereof. When it is desired to remove the supporting block 50 in the stub shaft 54 from the end 40 of the shaft 25, then the nut 84 is rotated on the screw downwardly until it is close to the top 83 of the supporting post 80.

The semi-circular supporting bracket 86 is then placed beneath the shaft 25 so that the hole 88 therein is in engagement over the end of the screw 82. The nut 84 is then rotated in a suitable direction in order to raise the semi-circular supporting member 86 upwardly until it is in tight supporting engagement with the shaft 25.

The stub shaft 54 and the block 50 may then be removed from the end 40 of the shaft 25 in the manner previously described and the shaft 25 will then be supported by the semi-circular bracket 86 which in turn is supported by the nut 84 and the screw 82 which are carried by the post 80.

When it is desired at the same time to free the end 41 of the shaft 24 from the frame 20, then the additional semi-circular member 90 may be mounted upon the shaft 25 in the manner shown, this additional member carrying the screw 91 and the nut 92 which has the same formation and operation as the nut 84. The part circular supporting member 93 is then placed beneath the shaft 24 so that the opening 94 in the said supporting member 93 is in registration with the end of the screw 91 and the nut 92 is rotated until it forces the supporting member 93 against the shaft 24, in which case the shaft 24 is now fully supported and the stub shaft 54 and the block 50 may be withdrawn from the end 41 of the shaft 24, thus freeing that end of the shaft and making it possible to remove the knives 30.

In the operation of the apparatus for this purpose all of the knives 30 and 31 are loosened upon the shafts 24 and 25 and slid to the position shown in Figure 7, where they all are placed between ends 40 and 41 of the shafts which are to be disconnected and the support afforded by the brackets 93 and 86 so that when the ends 40 and 41 of the shafts are disconnected, these knives may readily be removed.

After these knives are removed, other knives may be put in place or the same knives may be reground and replaced. Then after the ends 40 and 41 are re-connected to the frame 20 in the manner previously described, the supporting members 86, 90 and 93 may be removed, and then the knives 30 and 31 may be moved to their appropriate positions upon their shafts, when once more the appearance of the shafts will be that shown in Figure 1.

The ends of the shafts 24 and 25 opposite the ends 40 and 41 may be stabilized by appropriate bearings which will prevent longitudinal movement of the shafts along their axes without inhibiting rotation of the shafts. Thus the studs 100 of the shafts 24 and 25 may carry thereon angularly disposed annular raceways 101 which are aligned with appropriate corresponding raceways 102, 103 in the housing 29 of the end frame 21. Two parallel rows of roller bearings 104 and 105 are mounted in the raceways, as is shown in Figure 4; these roller bearings by reason of their angular disposition against the angularly disposed raceways prevent longitudinal movement of the shafts along their axes while at the same time providing for friction reduction.

Each of the shafts carry appropriate gears 110, 110 which may be utilized to provide any desired or necessary operative connection.

By each of the various apparatus above described, it is thus possible to mount a series of knives 30 and 31 upon the shafts 24 and 25 without removing the shafts from the machine. By this operation it thus becomes possible to utilize circular knives instead of matching segments which may not line up exactly.

In the present apparatus I have not shown a similar mounting for the shafts 35 and 36 which carry the scorers. The reason for this is that the same type of absolute accuracy which is necessary for cutting knives is not quite so essential for scoring members and that a seam in the scoring members, which is created by the fact that semi-circular segments are placed together, does not produce the defective results which may be produced by even a slight misalignment of the cutting knives.

This is so because a scorer is utilized for creasing the board along an area that is much wider than the area in which a cut is made. Preferably when a cut is made, no material is excised but the sheet material is merely slit along the cut. Any irregularity in the cutting knives may thus make the slit irregular. A score, however, is intended actually to have a lateral dimension and the slight misalignment which might occur in the event that the scoring segments are slightly inaccurately aligned is not of great materiality.

However, where the scores must be made as accurate as the slits, then a similar mounting may be provided for the shafts which carry the scoring members and the scoring members may then be completely circular and may be mounted upon their shafts in the manner previously described for the cutting knives.

It may be possible that after the knives have been mounted in appropriate complementary relationship, with each knife 30 in exact engagement with knife 31, that the overlap between the blades of the knife member 30 and the knife member 31 may be too great or too small and it may thus be necessary to raise or lower the shaft 24 with respect to the shaft 25. The same sort of problem may arise also in connection with the scoring shafts 35 and 36.

Similar means may be provided in connection with both sets of shafts in order to provide for spacing the complementary shafts by causing these shafts to approach or move away from each other.

The members which may effect the separation of, for instance, shafts 24 and 25 or the approach of shafts 24 and 25 toward each other, need be mounted only in connection with, for instance, shaft 24 and only one shaft need be moved. It is necessary, however, that this shaft be mounted in such a manner as to permit the movement thereof in the manner now to be described.

Figures 5, 6:
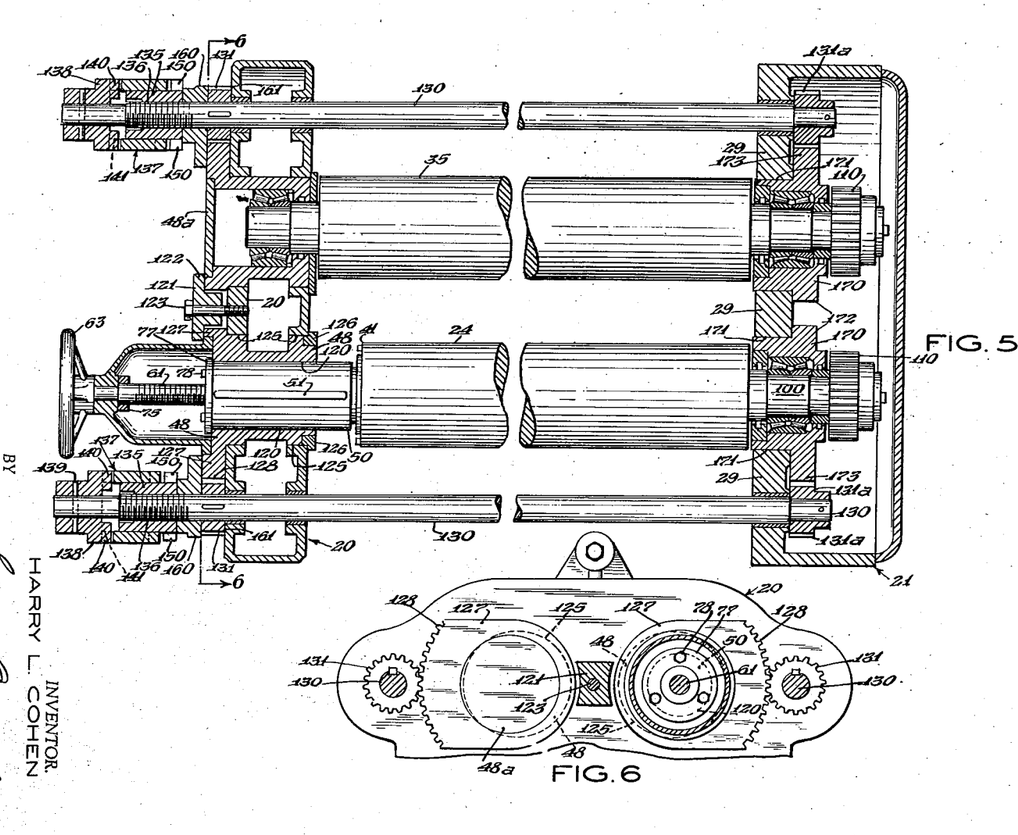
Figure 5 is a cross-sectional view taken along line 5—5 of Figure 2.
Figure 6 is a cross-sectional view taken along line 6—6 of Figure 5.

As is seen in Figures 2, 5 and 6, the bearing 48 which supports the end 41 of the shaft 24 is an accentric member; that is, the opening 120 in the bearing 48 in which the block 50 and the housing 121 thereof is supported, is eccentric with respect to the opening 125 in the frame member 20 in which the bearing 48 is mounted.

Thus when the bearing 48 is rotated within the opening 125 in the frame 20, owing to the eccentricity of the opening 120 of the bearing, the shaft 24 may be raised or lowered. The bearing 48 is secured in the opening 125 by means of the annular ring 126 secured to the bearing on the inner side of the frame and by means of the integrally extended flange 127 of the bearing on the outer side of the frame 20. The flange 127 is at 128 extended into a gear segment to provide means for rotating the flange 127 and hence means for rotating the bearing 48 to produce the consequent rotation of the opening 120 of the bearing 48 which results in a raising or lowering of the shaft 24.

The means for causing the bearing 48 to rotate by means of the gear segment 128 includes the shaft 130 which is mounted between the frames 20 and 21. This shaft 130 carries a pinion 131 keyed thereto and rotatable therewith. This pinion 131 meshes with the gear segment 127. A nut 135 is mounted in screw thread engagement with the threads 136 on one end of the shaft 130. A clutch sleeve 137 is slidably mounted on the nut 135 and is rotatable about the body portion of the nut 135.

The outermost end of the shaft 130 carries a complementary clutch member 138 which is pinned thereto by means of the pin 139. This complementary clutch member carries engagement lugs 140. The clutch sleeve 137 has corresponding engagement lugs 141 on the outermost end thereof. These corresponding engagement lugs 141 are adapted to mesh with the engagement lugs 140 on the clutch member 138. The clutch sleeve 137 carries a handle 145 which preferably is integrally extended therefrom.

When the sleeve 137 is by means of the handle 145 moved outwardly and toward the left with respect to Figures 1 and 5, then the complementary engagement lugs 141 and 140 mesh, and rotation of handle 145 produces rotation of the shaft 130 and consequent rotation of the pinion 131 thus causing a corresponding rotation of the gear segment 128, and thus rotating the bearing 48 and raising or lowering the end of the shaft 24.

When the end of the shaft 24 has been raised or lowered to the proper limits, then it becomes necessary to lock the shaft in place. Accordingly, the clutch sleeve 137 is moved inwardly out of engagement with the clutch member 138 and into engagement with the engagement lugs 150 of the nut 135. The clutch sleeve has lugs 151 which are arranged to engage with the lugs 150 of the nut 135.

Now rotation of the sleeve 137 by the handle 145 will result in rotation of the nut 135 which will drive the sliding locking plate 160 against the pinion 131 and against the flange 127 and the gear segment 128 of the rotatable bearing 48.

The driving of the lock plate against these members will also drive these members against the wall 161 of the frame portion 20 and thus serve to lock the pinion and the gear segment and hence the bearing 48 between the lock plate 160 and the wall 161, thus maintaining the setting.

The opposite end of the shaft is operated upon simultaneously and is simultaneously held in the set position. This is accomplished by the rotatable bearing 170 in which the end 100 of the shaft is mounted.

The shaft 100 is mounted eccentrically of the rotatable bearing 170 in the same manner as the other end of the shaft is mounted eccentrically in the bearing 48. The bearing 170 is rotatable in the opening 171 of the housing 29 of the frame member 21. The bearing 171 is positioned in this opening in any suitable manner and has a flange 172 which at one end thereof has the form of a gear segment 173, which meshes with the pinion 131a which is keyed to the shaft 130. Rotation of the shaft 130 thus causes rotation of the pinion 131a and rotation of the bearing 170 in the same manner that bearing 48 is rotated and locking of the pinion 131 by means of the nut 135 and the lock plate 160, locks the shaft 130 in place, thus locking the pinion 131a in place, thus locking the bearing 170.

When desired a suitable indicator or dial may be provided to indicate the setting of the shaft and the degree to which it has been raised or lowered. Thus, as is seen in Figure 2, a dial 180 may be marked upon the gear segment to register with the pointer 181 on the stationary housing. The dial may be marked off in 16ths of an inch or less to indicate different levels of the shaft. The gears which connect the shafts with the power source may be of a sufficiently deep mesh so that slight movement of one shaft away from the other will not serve to disconnect the driving gears from each other.

Figures 9, 10:
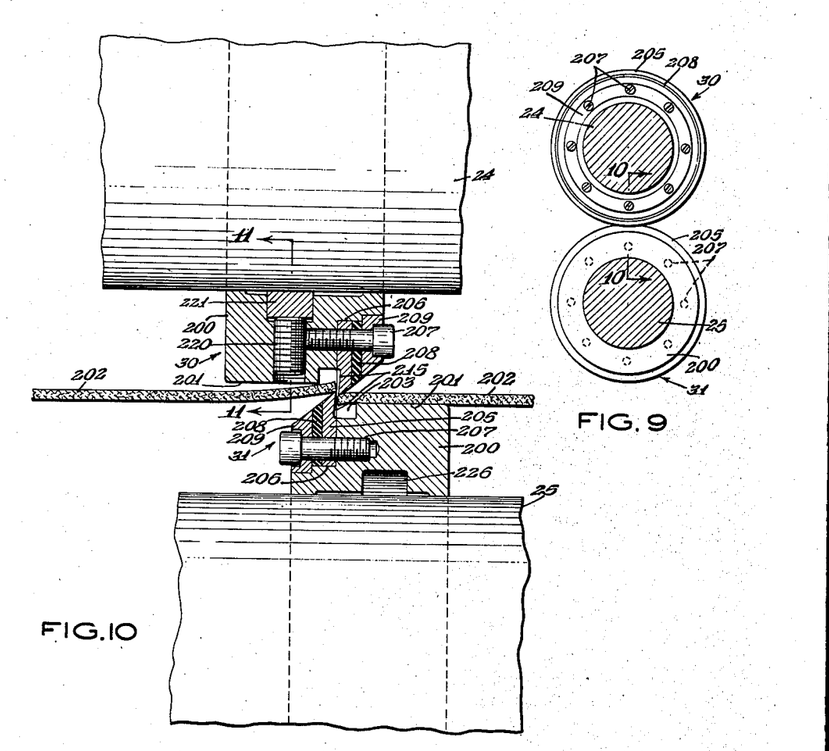
Figure 9 is a cross-sectional view, partly in elevation, taken along line 9—9 of Figure 7.
Figure 10 is a cross-sectional view taken along line 10—10 of Figure 9.

As is seen more particularly in Figures 9 and 10, each of the circular knives 30 and 31 have exactly the same form but are simply reversed with respect to each other. Each of the knives comprises an annular mounting member 200 which has a shoulder 201. When the knife is used as a knife 31 on the lower shaft 25, then the shoulder 201 serves to support the web 202 while it is being cut.

A groove 203 is provided in the mounting 200 adjacent the shoulder 201 in order to provide effective clearance for the knife plate. An annular knife plate 205 is mounted in a recess 206 in the mounting plate 200 and positioned and secured therein by bolts 207.

A resilient annular ring or washer 208 is positioned outside of the knife 205 and a securing plate 209 is mounted thereover. The bolt passes through the securing plate 209, the resilient ring 208 and the knife 205 into the mounting ring 200.

By using a large number of closely spaced bolts, the knife may be securely attached to the mounting ring and be made virtually integral therewith.

In order to provide effective clearance for cutting and to improve the cutting, the cutting faces 215, 215 of the knives 205 may be dished or bevelled as shown in Figure 10 preferably to approximately ½ a degree.

The mounting ring 200 of the knife assembly 31 may be secured on the shaft by means of a lock nut 220 passing through the mounting ring 200 and pressing against the shaft 24.

In order, however, to avoid marring the shaft 24, I prefer to mount a relatively soft bearing plate 221 between the lock nut 220 and the shaft 24. While the lock nut 220 may be of hard steel and the shaft 24 may also be of hard steel, the bearing plate 221 may be of cast iron or any other metal or material which is softer than steel and which is sufficiently wide to provide a bearing surface.

Figure 11:
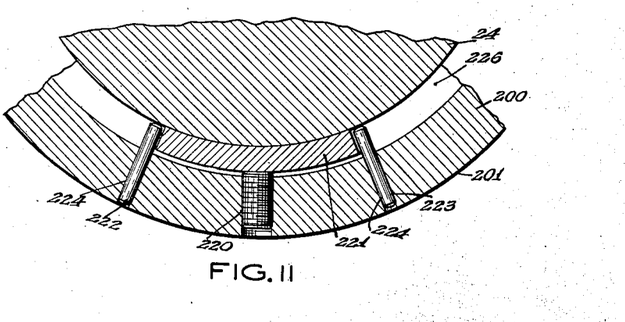
Figure 11 is a cross-sectional view taken along line 11—11 of Figure 10.

The bearing plate 221 is slightly loose in its mounting so that the lock nut 220 may press against the bearing plate 221 and thus press the bearing plate 221 tightly against the shaft 24, thus serving to secure and position the knife assembly 30 or 31. The bearing plate 221 may be secured in position on the mounting ring 200 by a pair of dowel pins 222 and 223 which are securely held in the perforations 224, 224 of the mounting ring 200 and which extend beyond the inner periphery of the slot 226 in the mounting ring 200.

By reason of the angular displacement of the dowel pins with respect to each other and the thickness of the bearing plate 221, the bearing plate is held in position by the dowel pins 222 and 223. The bearing plate 221 is held within the slot 226 cut out of the inner periphery of the mounting ring 200. The remainder of the mounting ring bears directly against the shaft 24 but it should be noted that here it is the entire surface of the mounting ring 200 which is pressed against the shaft 24 and not simply the lock screw 220 and hence no additional bearing surface is required between the remainder of the mounting ring 200 and the shaft 24.

In the operation of my invention it is desirable and necessary, in fact, that the sheet material to be scored and slit be accurately positioned when fed to the scoring and slitting members. Hence an accurate side gauge is of prime importance and in Figures 12 and 13 I have shown the specific details of the side gauge which appears in Figures 2 and 3.

Figures 12, 13:
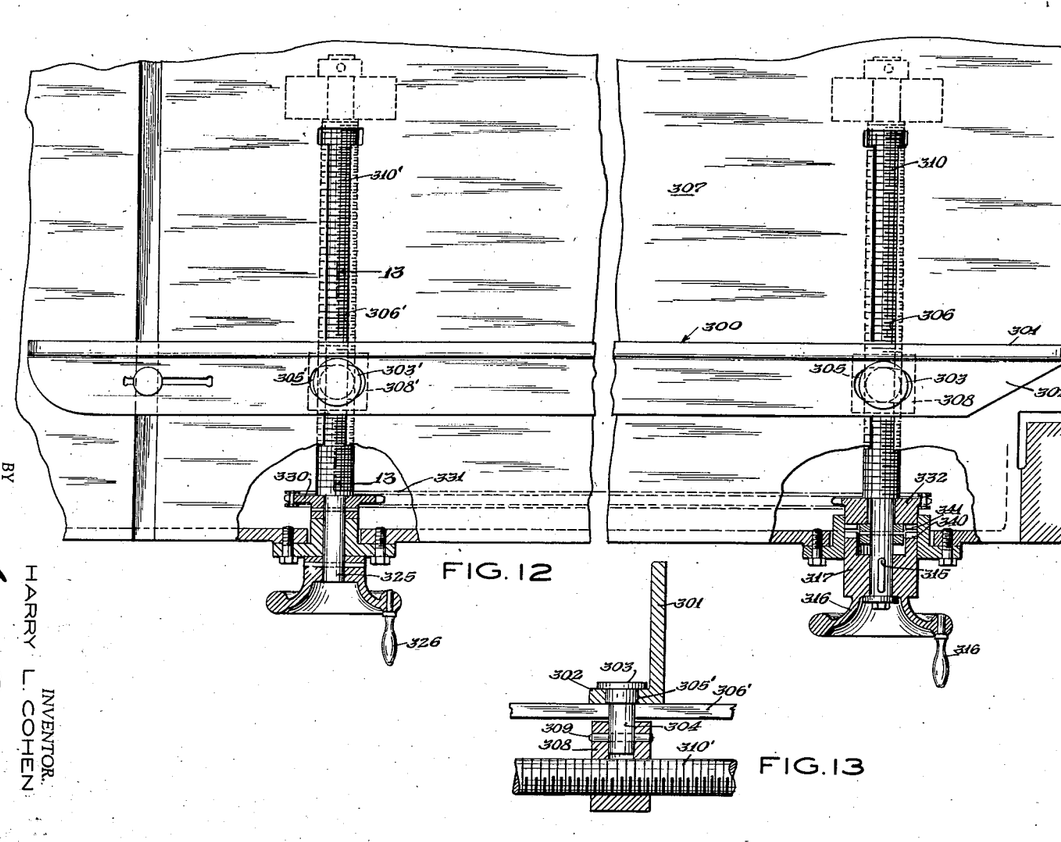
Figure 12 is a top view, partly in cross-section taken from line 12—12 of Figure 2, looking in the direction of the arrows.
Figure 13 is a cross-sectional view taken along line 13—13 of Figure 12.

The side gauge 300 comprises an angle iron member having a flange or wall 301 which is to bear against and position the sheet material to be fed and a supporting flange 302. A pin having a head 303 and a shaft 304 is mounted in a perforation 305 of the supporting flange 302 of the side gauge. One such pin is mounted near each end of the side gauge as is shown in Figure 12. The shaft 304 of the pin extends through the slot 306 in the bed 307 of the apparatus.

A threaded block 308 is secured by means of the pin 309 to the shaft 304 of the pin. A screw 310 passes through the threaded block 308 and is in threaded engagement therewith so that rotation of the screw 310 will result in longitudinal movement of the block 308, particularly since the screw 310 is held stationary with respect to longitudinal movement even while it is being rotated.

Thus it will be seen that rotation of each of the screws 310 and 310' will result in corresponding movement of each block 308 and hence in corresponding movement of each end of the side gauge 300 and thus serve to position the side gauge.

The screw 310 is integrally extended to and connected with the shaft 315 upon which is mounted the handle 316. The handle 316 is mounted on a bearing 317 which is slidable longitudinally of the shaft 315 but rotation of which results in rotation of the shaft 315. Hence when the handle 316 is rotated it rotates the shaft 315, thus rotating the screw 310 and moving the associated block 308.

The opposite end of the side gauge is not at that time operated and hence remains stationary. The screw 310' at the opposite end of the side gauge is integrally extended to the shaft 325 which carries the handle 326 securely attached thereto so that rotation of the handle results in rotation of the shaft 325 and of the screw 310'. Thus the screw 310' might be operated by the handle 326 independently of the screw 310 which is operated by the handle 316.

The shaft 325 carries secured thereto the sprocket 330 which carries one end of the continuous chain 331. The other end of the continuous chain 331 is supported by the sprocket 332, which sprocket, however, is free to rotate about the shaft 315.

Hence rotation of handle 326 although it results in rotation of shaft 325 and rotation of screw 310' and although it results in rotation of sprockets 330 and 332 does not cause the rotation of the shaft 315 or the screw 310 because of the fact that the sprocket 332 is free to rotate about the shaft 315.

Likewise rotation of shaft 316 while it is in the position shown in Figure 12 results only in rotation of shaft 315 and screw 310.

Thus each of the screws 310 and 310' may be individually adjusted where that is necessary to obtain a slightly non-parallel condition of the side gauge 300. Normally, however, it is frequently desirable that both ends of the side gauge be adjusted simultaneously. Accordingly the bearing 317 for the handle 316 has a plurality of lugs 340 which may engage with a corresponding plurality of lugs 341 on the loose sprocket 332. When the handle 316 is now pushed in so that the lugs 340 engage the lugs 341, then rotation of the handle 316 will result not only in rotation of the shaft 315 but also in rotation of the sprocket 332.

Thus the screw 310 will be rotated by reason of the rotation of the shaft 315 and the screw 310' will be rotated by sprocket 332, the motion of which is communicated to sprocket 330 which is mounted on the shaft 325 of the screw 310'; and by this means both the screws 310 and 310' may simultaneously be rotated when the handle 316 is pushed in so that the members 340 and 341 are interengaged.

By the means above described, it thus becomes possible to adjust the side gauge in parallel condition so that both ends thereof are adjusted simultaneously and to adjust each end of the side gauge separately where the side gauge may accidentally have fallen out of alignment or where it is desirable, owing to the peculiarities of the sheet to be cut and scored, to make the side gauge slightly non-parallel to the path which the sheets must follow.

In describing each of the foregoing portions of my combination slitter and scorer, I have at the same time described the operation of each of these members so that the function, utility and value of each of the portions of my invention should now be clear to those skilled in the art.

By the construction of my invention it is possible to use circular knives mounted on continuous rings and constituting themselves continuous rings without making it necessary to remove the mounting shaft from the machine in order to place the knives thereon.

By the invention above described it is possible actually to free one end of the shaft from the frame to provide a space between the said end of the shaft and the frame so that circular members may be mounted on the shaft while the shaft remains in its ordinary position relative to the remainder of the machine.

In connection with the foregoing, I have also provided a novel means for adjusting the shafts with respect to each other so as to cause the knives to mesh differently for different thicknesses of sheet to be cut or different types of sheets which are to be cut or for different depths of scores which may be necessary and further in connection with the foregoing I have also provided a novel type of cutting knife which is made possible to a great extent by the fact that the knife may be readily placed upon and removed from the shaft.

This knife inherently by its formation and the mounting thereof provides a support for the sheet that is being cut, means for clearing the edge of the knife and means for mounting the knife on the shaft in such a manner that it will not mar the shaft.

In addition and in connection with the foregoing I have provided a novel type of side gauge with a means for independently adjusting the two ends of the gauge to obtain any desired alignment which may be necessary and also in connection with means for adjusting both ends of the gauge simultaneously when that is desired.

Many variations of the device above described and discussed will now be obvious to those skilled in the art and many other adaptations and uses thereof should now be clear. I prefer, therefore, to be bound not by the specific disclosures herein but only by the appended claims.

I claim:

1. A retractable support for the end of a rotatable shaft, said support being slidably mounted in a side frame, said support carrying a stub-shaft; an opening in the said end of said rotatable shaft, said stub-shaft being insertable in said opening, friction reducing means between said stub-shaft and the interior of the said opening, and means for sliding said support in said side frame to cause the stub-shaft to engage and disengage the end of said rotatable shaft.

2. A retractable support for the end of a rotatable shaft, said support being slidably mounted in a side frame, said support carrying a stub-shaft; an opening in the said end of said rotatable shaft, said stub-shaft being insertable in said opening, friction reducing means between said stub-shaft and the interior of the said opening, said support having a threaded opening therein, the axis of said opening extending along a line parallel to the axis of the rotatable shaft, a rotatable screw engageable with the threads of said opening, means for restraining said screw against longitudinal movement, and means for rotating said screw to slidably move said support in said side frame member to cause said stub-shaft carried by said support to engage and disengage the end of said rotatable shaft.

3. A rotatable shaft mounted between two opposed side frame members, a retractable support for one end of said shaft, said support being slidably mounted in a side frame, said support carrying a stub-shaft; an opening in the said end of said rotatable shaft, said stub-shaft being insertable in said opening, friction reducing means between said stub-shaft and the interior of the said opening, said support having a threaded opening therein the axis of said opening extending along a line parallel to the axis of the rotatable shaft, a rotatable screw engageable with the threads of said opening, means for restraining said screw against longitudinal movement, and means for rotating said screw to slidably move said support in said side frame member to cause said stub-shaft carried by said support to engage and disengage the end of said rotatable shaft, the opposite end of said shaft being rotatably supported in a bearing in the opposite side frame member, means in said bearing for restricting axial movement of said shaft.

4. A mounting for a shaft, said mounting comprising a pair of side frame members and a cross member, said shaft being rotatably mounted between said side members in bearings supported by said side members, one end of said shaft being rotatably mounted in one of said bearings, the other end of said shaft being releasably supported by its bearing, the said latter bearing being retractable into the side frame member in which it is mounted; there being a space between the said other end of said shaft and the adjacent side frame when said retractable bearing is drawn into said frame, and means for supporting said other end of said shaft when said retractable bearing is withdrawn from supporting position.

5. A mounting for a shaft, said mounting comprising a pair of side frame members and a cross member, said shaft being rotatably mounted between said side members in bearings supported by said side members, one end of said shaft being rotatably mounted in one of said bearings, the other end of said shaft being releasably supported by its bearing, the said latter bearing being retractable into the side frame member in which it is mounted; there being a space between the said other end of said shaft and the adjacent side frame when said retractable bearing is drawn into said frame, and means for supporting said other end of said shaft when said retractable bearing is withdrawn from supporting position, said means comprising a vertical post on said cross brace mounted at a point between the center of the shaft and said retractable bearing, means on said vertical post for releasably supporting a part circular shaft cradling member, said shaft cradling member being securable in shaft cradling position before said retractable bearing is retracted.

6. A mounting for a shaft, said mounting comprising a pair of side frame members and a cross member, said shaft being rotatably mounted between said side members in bearings supported by said side members, one end of said shaft being rotatably mounted in one of said bearings, the other end of said shaft being releasably supported by its bearing, the said latter bearing being retractable into the side frame member in which it is mounted; there being a space between the said other end of said shaft and the adjacent side frame when said retractable bearing is drawn into said frame, and means for supporting said other end of said shaft when said retractable bearing is withdrawn from supporting position, said means comprising a vertical post on said cross brace mounted at a point between the center of the shaft and said retractable bearing, means on said vertical post for releasably supporting a part circular shaft cradling member, said shaft cradling member being securable in shaft cradling position before said retractable bearing is retracted, and means for similarly supporting a vertically adjacent parallel shaft comprising a second part circular member mountable on the first shaft and engageable with the shaft cradling member of said first shaft; said second part circular member carrying means for releasably securing a third part circular member for cradling said vertically adjacent shaft.

7. In a machine for slitting sheet material, a pair of vertically adjacent rotatable shafts each carrying circular cutting knives; said shafts being rotatably supported in bearings carried by opposed side frame members; means for releasing one end of each of said shafts from its rotatable support and for supporting said shaft in unchanged relationship to said side frames with a space between said end of said shaft and its associated side frame through which said circular cutting knives may be passed for removing and replacing said knives; said means comprising a retractable support for said end of each shaft, each support being slidably mounted in said side frame, each support carrying a stub-shaft; an opening in the end of each rotatable shaft, said stub-shaft being insertable in said opening, friction reducing means between said stub-shaft and the interior of said opening; means for sliding each support in said side frame to cause said stub-shaft of each support to engage and disengage the said end of each rotatable shaft; and means for alternatively supporting each of said shafts at a point between the center of each shaft and the end thereof supported by the retractable bearing, when said bearing is retracted.

8. In a machine for slitting sheet material, a pair of vertically adjacent rotatable shafts each carrying circular cutting knives; said shafts being rotatably supported in bearings carried by opposed side frame members; means for releasing one end of each of said shafts from its rotatable support and for supporting said shaft in unchanged relationship to said side frames with a space between said end of said shaft and its associated side frame through which said circular cutting knives may be passed for removing and replacing said knives; said means comprising a retractable support for said end of each shaft, each support being slidably mounted in said side frame, each support carrying a stub-shaft; an opening in the end of each rotatable shaft, said stub-shaft being insertable in said opening, friction reducing means between said stub-shaft and the interior of said opening; means for sliding each support in said side frame to cause said stub-shaft of each support to engage and disengage the said end of each rotatable shaft; and means for alternatively supporting each of said shafts at a point between the center of each shaft and the end thereof supported by the retractable bearing, when said bearing is retracted, said circular knives being movable along each shaft to an area thereof between the end supported by the retractable bearing and the point of engagement of said alternative support, before engagement and after disengagement by said alternative support with each shaft.

9. A retractable support for the end of a rotatable shaft, said support being slidably mounted in a side frame; means on said support and means on said end of said shaft for interengaging said shaft and support for rotatably supporting said end of said shaft; said means comprising a stub-shaft on one of said members axially insertable into an opening in the other of said members, friction reducing means between said stub-shaft and the interior of said opening, said support having a threaded opening therein, the axis of said opening extending along a line parallel to the axis of the rotatable shaft, a rotatable screw engageable with the threads of said opening, means for restraining said screw against longitudinal movement, and means for rotating said screw to slidably move said support in said side frame member to cause said stub-shaft on one member and the opening in the member to be interengaged.

10. An adjustable mounting for a rotatable shaft, said mounting comprising a pair of opposed bearings rotatable in opposed side frames; said bearings carrying the ends of said shaft eccentrically with respect to said bearings; means for rotating said bearings to cause the ends of the shaft to move about the center of rotation of said bearings, said means comprising a gear segment on each of said bearings, a pinion engaging each of said gear segments; each pinion being mounted on a common shaft; means for rotating the said pinion carrying shaft and means for locking said pinion carrying shaft in set position.

11. An adjustable mounting for a rotatable shaft, said mounting comprising a pair of opposed bearings rotatable in opposed side frames; said bearings carrying the ends of said shaft eccentrically with respect to said bearings; means for rotating said bearings to cause the ends of the shaft to move about the center of rotation of said bearings, said means comprising a gear segment on each of said bearings, a pinion engaging each of said gear segments; each pinion being mounted on a common shaft; means for rotating the said pinion carrying shaft and means for locking said pinion carrying shaft in set position, said last mentioned means comprising a locking plate slidable on said pinion carrying shaft and engageable with side of one of said gear segments and the side of one of said pinions and a locking nut on said shaft rotatable against said locking plate to press said plate against said gear segment and pinion.

12. An adjustable mounting for a rotatable shaft, said mounting comprising a pair of opposed bearings rotatable in opposed side frames; said bearings carrying the ends of said shaft eccentrically with respect to said bearings; means for rotating said bearings to cause the ends of the shaft to move about the center of rotation of said bearings, said means comprising a gear segment on each of said bearings, a pinion engaging each of said gear segments; each pinion being mounted on a common shaft; means for rotating the said pinion carrying shaft and means for locking said pinion carrying shaft in set position, said last mentioned means comprising a locking plate slidable on said pinion carrying shaft and engageable with side of one of said gear segments and the side of one of said pinions and a locking nut on said shaft rotatable against said locking plate to press said plate against said gear segment and pinion, means for rotating said pinion carrying shaft and said locking nut, comprising a sleeve slidable upon and rotatable about said nut, a handle for said sleeve; means on said locking nut engageable with one end of said sleeve and means on the end of said pinion shaft engageable with the other end of said sleeve, said sleeve being slidable into engaging position with said means on the end of said pinion shaft to rotate said shaft, and being slidable into engaging position with said means on said locking nut to rotate said nut.

13. An adjustable mounting for a rotatable shaft, said mounting comprising a pair of opposed bearings rotatable in opposed side frames; said bearings carrying the ends of said shaft eccentrically with respect to said bearings; means for rotating said bearings to cause the ends of the shaft to move about the center of rotation of said bearings, said means comprising a gear segment on each of said bearings, a pinion engaging each of said gear segments; each pinion being mounted on a common shaft; means for rotating the said pinion carrying shaft and means for locking said pinion carrying shaft in set position, an indicator on said rotatable bearing registerable with a stationary indicator for indicating the degree of adjustment.

14. An adjustable gauge for the bed of a machine, said gauge comprising a longitudinal sheet positioning member, a pair of slots in the bed of said machine substantially normal to said sheet positioning member, blocks secured to the base of said sheet positioning member and extending through said slots; a threaded perforation in each block, a screw extending beneath each slot and in threaded engagement with each perforation in each block, said screws being rotatable but fixed against longitudinal movement, rotation of each screw moving each block and moving the portion of the sheet adjustment member to which the block is attached, means for independently rotating each screw, and means for selectively interengaging said screw rotating means for simultaneous rotation of said screws, said last mentioned means comprising a handle slidable longitudinally on the shaft of one of said screws, rotation of said handle rotating said screw, a member journalled on the shaft of said screw and rotatable about said shaft, driving means between said member and said other screw, said handle being selectively slidable into engagement with said member for rotating said member when said first screw is rotated.

HARRY L. COHEN.